May 11, 1954 B. D. LOUGHLIN 2,678,388

SIGNAL-TRANSLATING SYSTEM FOR TELEVISION RECEIVERS

Filed Aug. 14, 1950 2 Sheets-Sheet 1

INVENTOR.
BERNARD D. LOUGHLIN

BY Lawrence B. Dodds

ATTORNEY

SIGNAL-TRANSLATING SYSTEM FOR TELEVISION RECEIVERS

Filed Aug. 14, 1950

INVENTOR.
BERNARD D. LOUGHLIN

BY Laurence B. Dodds

ATTORNEY

Patented May 11, 1954 2,678,388

UNITED STATES PATENT OFFICE 2,678,388

SIGNAL-TRANSLATING SYSTEM FOR TELEVISION RECEIVERS

Bernard D. Loughlin, Lynbrook, N. Y., assignor to Hazeltine Research, Inc., Chicago, Ill., a corporation of Illinois Application August 14, 1950, Serial No. 179,121

20 Claims. (Cl. 250—27)

GENERAL

Figures 1, 3, 4, 6:
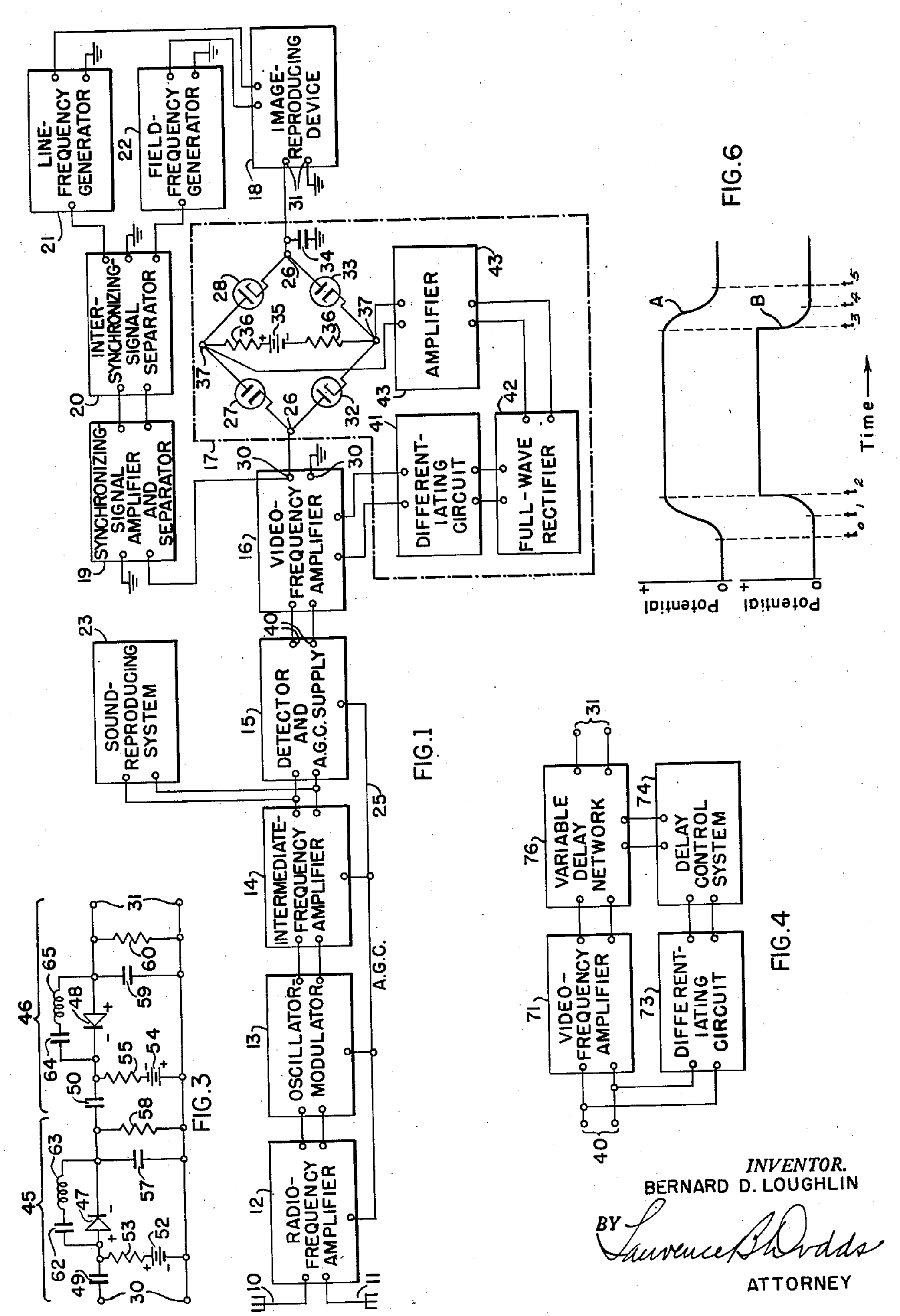

The present invention relates to transient-modifying electrical signal-translating systems for television receivers and, particularly, to such systems which are effective, while translating an applied television signal including unidirectional transients, to develop a television output signal including modified transients which may correspond aproximately to but have slopes much steeper than those of the transients appearing in the applied signal. The term "unidirectional transient," as employed in the specification and claims, is intended to denote a sudden change in the amplitude of a signal such as may occur in the video-frequency portion of a detected television signal between two amplitude levels thereof. Transient-modifying electrical signal-translating systems of the type under consideration have particular utility in television receivers for improving the sharpness of the images produced thereby and, hence, will be described in that environment.

There presently exists the belief that much of the eye fatigue and displeasure often experienced by individuals viewing the image or picture produced by a television receiver is due to insufficient sharpness of the picture rather than to inadequate detail or resolution. By sharpness of the reproduced picture is meant the rate of change of brightness thereof with space, that is, sharpness is related to the appearance of a distinct edge between two areas of different brightness. The lack of sharpness of the picture being watched is believed to cause the eye muscles of an observer to function in such a manner as to attempt to produce a sharper or better focused image on the retina of the eye. When the picture being viewed has insufficient sharpness, there may result a continued subconscious action on the part of the observer to focus his eyes in the manner just mentioned, thus causing eye fatigue. On the other hand, inadequate detail in the viewed picture is believed merely too influence the recognition of fine detailed objects. It has been recognized that the above-mentioned distress experienced by those observing television entertainment will be further aggravated as the use of television image-reproducing devices with larger display areas becomes more widespread. This is because one observing a larger television picture is more likely to sit at such a viewing distance from the television screen that the picture will subtend a larger angle, thus making the "grain" or "spot" structure of the picture more visible. This follows since an observer is able more easily to resolve the "grain" or "spot" structure of a larger picture. Since the present trend in television receivers is toward the use of larger image-reproducing devices therein, the problem of providing greater sharpness in television pictures is assuming greater importance.

In a complete television system including both the transmitter and the receiver, there are one or more factors which are instrumental in causing the bandwidth of a television signal translated thereby to be limited. Band-width limitation occurs in the scanning spot of the camera or picture tube at the transmitter, in the signal-translating channels of both the transmitter and the receiver, and in the scanning spot of the image-reproducing device of the receiver. The limitation on bandwidth imparts a corresponding limitation on the detail or resolution of the picture produced by the receiver of the television system. In conventional television receivers, the relatively limited bandwidth of the signal-translating channels thereof undesirably places a limitation on the sharpness of the reproduced picture. Heretofore it had been the opinion of workers in the television art that the resulting limitation placed on the sharpness of the reproduced picture was a fundamental one. Experience has indicated that while band-width limitation may fundamentally place a restriction on the sharpness of the picture reproduced by a television apparatus having a linear characteristic, this band-width limitation is not a necessary restriction in a television apparatus which effectively has a nonlinear characteristic.

It recently has been conclusively demonstrated that the sharpness of the reproduced television picture need not be limited by the bandwidth of the television signal-translating circuits and the scanning spots mentioned above, thus disproving the belief formerly held by those skilled in the art. In prior television receivers, however, the reduced bandwidth afforded by the electrical circuits and the scanning spots inherently prevented the translation of the highest frequency components of an applied television signal, thus prolonging the time required for a transient to pass from one amplitude level to another. This resulted in a degraded transient having a gradual slope rather than a steep one, thus causing a general lack of sharpness in the reproduced picture. It has been established that the reduced bandwidth of the signal-translating stages of television apparatus, such as a television receiver, is effective to control only the permissible minimum time separation between two successive unidirectional transients but need not control the permissible steepness of a transient.

Although it is ordinarily desirable to employ transient-modifying electrical signal-translating systems in accordance with the present invention in connection with television receivers having pass-band characteristics such as are ordinarily employed in receivers available today, it may be desirable for many applications, such as in low-cost receivers having relatively inexpensive circuits characterized by their narrow pass-band characteristics, to utilize therein transient-modifying signal-translating systems which enable such receivers to produce pictures having a sharpness comparable to that of pictures produced by conventional television receivers. Thus, relatively inexpensive television receivers capable of producing a satisfactory image can be made available to a large group of the public to whom television receivers heretofore were unavailable because of the price thereof.

It is an object of the invention, therefore, to provide a new and improved signal-translating system for a television receiver which avoids one or more of the above-mentioned disadvantages and limitations resulting from the use of prior translating systems in television receivers.

It is another object of the invention to provide a relatively simple signal-translating system for use in a television receiver to enable the receiver to produce a picture which is considerably sharper than has heretofore been obtainable.

It is a further object of the invention to provide a new and improved signal-translating system for use in a television receiver to reduce the eye fatigue and displeasure ordinarily experienced by some observers of the television pictures produced by the receiver.

It is yet another object of the invention to provide a new and improved transient-modifying signal-translating system for use in a television receiver provided with an image-reproducing system having a relatively large display area to produce a sharp picture thereon.

It is an additional object of the invention to provide a transient-modifying electrical signal-translating system for a television receiver having a narrow pass-band characteristic to enable that receiver to develop a television image having a sharpness comparable to that of the image produced by a conventional television receiver having a much wider band-pass characteristic.

In accordance with a particular form of the invention, a transient-modifying electrical signal-translating system for a television receiver for translating a television picture signal which may include unidirectional transients comprises a television signal-translating channel normally having a substantially linear signal-translating characteristic for an applied television picture signal. The signal-translating system also includes control-circuit means coupled in circuit with the channel for developing a control effect related to a derivative of the transient. The signal-translating system further includes means responsive to the aforesaid control effect for modifying the signal-translating characteristic of the channel within a short interval after the initiation of the transient, whereby the output signal of the channel approximately corresponds to the applied signal with modified transients.

The term "derivative," as employed throughout the specification and claims, is intended to denote any signal having the general wave form of a derivative. Broadly speaking, a derivative of an applied signal is a signal related to a changing characteristic of that applied signal, that is, a signal which has zero value when that applied signal is constant in magnitude at any particular amplitude level and has some magnitude other than zero when the applied signal has a transient between two amplitude levels. Thus, the broad term "derivative," as used in the specification and claims, is not necessarily a simple first, second, or third derivative but may include nonlinear functions of simple derivatives, cross products between simple derivatives, time-difference signals, or any other functions producing signals of the general form described above.

For a better understanding of the present invention, together with other and further objects thereof, reference is had to the following description taken in connection with the accompanying drawings, and its scope will be pointed out in the appended claims.

Figure 2:
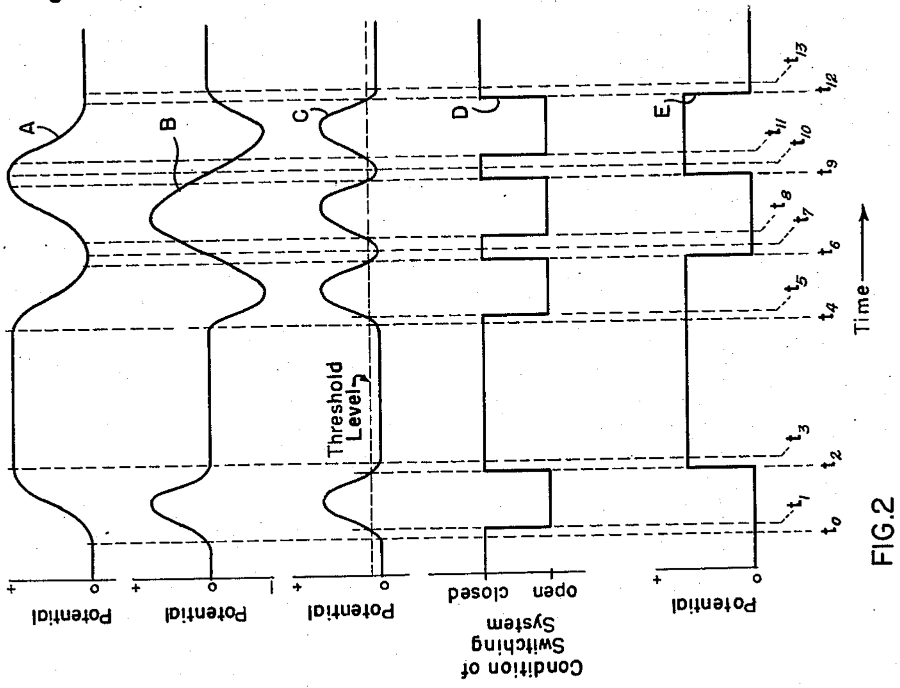
Figure 5:
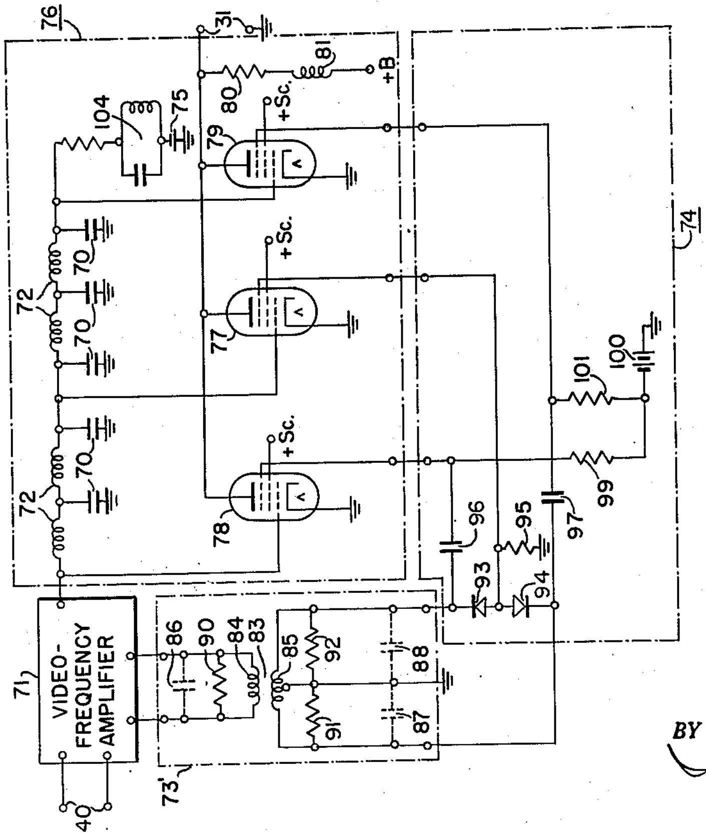

In the accompanying drawings, Fig. 1 is a circuit diagram, partly schematic, of a complete television receiver including a transient-modifying electrical signal-translating system in accordance with a particular form of the present invention; Fig. 2 is a graph utilized in explaining the operation of the transient-modifying electrical signal-translating system of the Fig. 1 receiver; Fig. 3 is a schematic circuit diagram of another form of the signal-translating system in accordance with the invention; Fig. 4 represents diagrammatically a further modification of a transient-modifying signal-translating system for a television receiver; Fig. 5 is a schematic circuit diagram of a signal-translating system corresponding to that represented in Fig. 4; and Fig. 6 is a graph utilized in explaining the operation of the system of Fig. 5.

*Description of Fig. 1 receiver*

Referring now more particularly to Fig. 1 of the drawings, the television receiver there represented comprises a receiver of the superheterodyne type including an antenna system 10, 11 coupled to a radio-frequency amplifier 12 of one or more stages. There is coupled to the latter unit in cascade, and in the order named, an oscillator-modulator 13, an intermediate-frequency amplifier 14 of one or more stages, a detector and automatic-gain-control or A. G. C. supply 15 having a pair of output terminals 40, 40, a video-frequency amplifier 16 of one or more stages and including output terminals 30, 30 connected to a low-impedance output circuit thereof such as to the cathode resistor of a cathode-follower video-frequency amplifier stage, a transient-modifying electrical signal-translating system 17, and a cathode-ray tube image-reproducing device 18 of conventional construction provided with input terminals 31, 31 and the usual line-frequency and field-frequency scanning coils (not shown) for deflecting the cathode-ray beam in two directions normal to each other. The A. G. C. supply circuit 15 is connected to the input circuits of one or more of the stages of units 12, 13 and 14 by a control-circuit conductor 25. Connected to the output terminals of the intermediate-frequency amplifier 14 is a conventional sound-reproducing system 23 which comprises the usual amplifiers, a frequency detector, and a loudspeaker.

An output circuit including the terminals 30, 30 of the video-frequency amplifier 16 is coupled to the input circuit of a line-frequency generator 21 and a field-frequency generator 22 through a synchronizing-signal amplifier and separator 19 and an intersynchronizing-signal separator 20. The output circuits of the generators 21 and 22 are coupled in a conventional manner to the scanning coils of the image-reproducing device 18. The units 10–23, inclusive, with the exception of the transient-modifying electrical signal-translating system 17 which is constructed in accordance with the present invention and will be described in detail hereinafter, may be of conventional construction and operation so that a detailed description and explanation of the operation thereof are unnecessary herein.

*General operation of Fig. 1 receiver*

Considering briefly, however, the general operation of the above-described receiver as a whole, television signals intercepted by the antenna system 10, 11 are selected and amplified in the radio-frequency amplifier 12 and are supplied to the oscillator-modulator 13, wherein they are converted into intermediate-frequency signals. The latter in turn are selectively amplified in the intermediate-frequency amplifier 14 and are delivered to the detector and automatic-gain-control supply 15. The modulation components of the signal are derived by the detector 15 and are supplied to the video-frequency amplifier 16 wherein they are amplified and from which they are supplied to the transient-modifying electrical signal-translating system 17 and then to the input circuit of the image-reproducing device 18. The transient-modifying operation of unit 17 will be explained in detail hereinafter. A control voltage derived by the automatic-gain-control supply of unit 15 is applied as an automatic-amplification-control bias to the gain-control circuits of units 12, 13 and 14 to maintain a signal input to the detector of unit 15 within a relatively narrow range for a wide range of received signal intensities.

Unit 19 selects the synchronizing signals from the other modulation components of the composite video-frequency signal applied thereto from the video-frequency amplifier 16. The line-synchronizing and field-synchronizing signals derived by the separator 19 are separated from each other by unit 20 and are then supplied to individual ones of the generators 21 and 22 to synchronize the operation thereof. An electron beam is produced by the cathode-ray image-reproducing device 18 and the intensity of this beam is controlled in accordance with the video-frequency and control voltages impressed on the brilliancy-control electrode by the terminals 31, 31. Saw-tooth current waves are generated in the line-frequency and the field-frequency generators 21 and 22, respectively, and are applied to the scanning coils of unit 18 to produce scanning fields, thereby to deflect the cathode-ray beam of that unit in two directions normal to each other to trace a rectilinear scanning pattern on the screen of the tube and thereby reconstruct the translated picture.

The audio-frequency modulation components of the received signal are derived in a conventional manner by the sound-reproducing system 23 and are applied to the loudspeaker thereof and converted to sound.

*Description of transient-modifying signal-translating system of Fig. 1*

Referring now more particularly to the portion of the receiver embodying the present invention, the transient-modifying electrical signal-translating system for translating a television signal which may include unidirectional transients comprises a television signal-translating channel normally having a substantially linear signal-translating characteristic for an applied television picture signal. As represented in Fig. 1, this channel comprises the circuit portion of unit 17 between the output terminals 30, 30 of the video-frequency amplifier 16 and the input terminals 31, 31 of the image-reproducing device 18. However, this signal-translating channel may be considered to include suitable amplifier stages such as the video-frequency amplifier 16 or even apparatus such as the units 12–16, inclusive. Particularly when considering the signal-translating channel from the last-mentioned standpoint, it may be regarded as having a pass-band characteristic comparable to that of the picture-signal translating channel of a conventional television receiver. This channel includes a bridge-rectifier circuit having two diagonally disposed terminals 26, 26 thereof conductively connected to the high-potential ones of the terminals 30, 30 and 31, 31. This bridge-rectifier circuit includes a pair of parallel-connected paths, the first path including rectifier devices 27 and 28 and the second path including rectifier devices 32 and 33. The rectifier devices may be of the contact, crystal or the thermionic type and, for convenience, have been represented as diodes. The anodes of the diodes 27 and 28 are connected together and the individual cathodes thereof are connected to opposite ones of the terminals 26, 26. The diodes 32 and 33 are connected to the terminals 26, 26 in a manner similar to the first-mentioned diodes but with opposite polarity. An energy-storage device comprising a condenser 34 is connected across the output terminals of the described signal-translating channel. An energizing source such as a battery 35 is connected with such polarity to the remaining pair of diagonally disposed terminals 37, 37 of the bridge-rectifier circuit through a pair of resistors 36, 36 as to maintain the diodes 27, 28, 32 and 33 in a normally conductive condition.

The transient-modifying electrical signal-translating system also includes control-circuit means coupled in circuit with the described signal-translating channel for developing a control effect related to a derivative of a transient. This means includes a differentiating circuit 41 of well-known construction coupled to an output circuit of the video-frequency amplifier 16 for developing a derivative of the signal applied thereto, in particular the first derivative of a transient of the signal, and a full-wave rectifier 42 which is coupled to the output circuit of the differentiating unit 41 for developing a signal corresponding to the absolute magnitude of the derivative signal. The control circuit further includes an amplifier 43 which is coupled between the output circiut of the full-wave rectifier 42 and the pair of diagonally disposed terminals 37, 37 of the bridge-rectifier circuit.

The transient-modifying signal translating system of the receiver further includes means, in the form of a normally closed electron-tube switching means or system in the signal-translating channel, responsive to the control effect developed by units 41, 42 and 43 for modifying the signal-translating characteristics of the aforesaid channel within a short interval after the initiation of the transient, whereby the output signal of the channel approximately corresponds to the applied signal with modified transients. This means comprises the diodes 27, 28, 32 and 33 of the previously described bridge-rectifier circuit.

*Operation of transient-modifying signal-translating system of Fig. 1*

The operation of the transient-modifying signal-translating system 17 represented in Fig. 1 and the results obtained thereby may be best understood by reference to Fig. 2 of the drawings. Each of the curves of Fig. 2 to be described hereinafter is exaggerated somewhat for the purpose of clarity. Curve A of Fig. 2 represents to a very enlarged scale a fragmentary portion of an amplified video-frequency signal supplied for a single line scansion by the output terminals 30, 30 of the video-frequency amplifier 16 to the transient-modifying signal-translating system 17. At time $t_0$ a positive-going transient of the television video-frequency signal is initiated and terminates at time $t_3$. Following the transient, the video-frequency signal continues at a substantially uniform positive amplitude level until time $t_4$ whereupon a second and negative-going transient occurs and terminates at approximately time $t_7$. At approximately time $t_7$ another positive-going transient is initiated and terminates at time $t_{10}$, whereupon an additional negative-going transient commences and terminates shortly thereafter at time $t_{13}$. For the purpose of the explanation which follows, it will be assumed that the pass-band characteristic of the signal-translating system of Fig. 1 including the amplifiers 14 and 16, when unmodified by the action of units 41-43, inclusive, is incapable of faithfully translating transients steeper than those represented in curve A of Fig. 2.

The differentiating circuit 41 responds to the various ones of the transients described in the preceding paragraph and, by the well-known differentiating operation, develops an output signal corresponding to curve B of Fig. 2. The output signal of circuit 41 represents the first derivative signal of that of curve A and is applied to the full-wave rectifier 42 which develops, in the well-known manner, an output signal having the waveform represented by curve C of Fig. 2. It will be seen that the signal of curve C comprises a unidirectional signal of positive polarity corresponding to the absolute magnitude of the first derivative of the signal represented by curve A. The output signal of the rectifier 42 is amplified by the unit 43 and is applied as a control potential to the terminals 37, 37 of the bridge-rectifier circuit or switching means, and this control potential may also be represented by curve C. Since the diodes 27, 28, 32 and 33 are normally maintained in a conductive state by the battery 35, the control potential represented by curve C does not exceed the threshold potential of the switching system comprising the diodes just mentioned until time $t_1$. This control potential is applied by the amplifier 43 with positive polarity to the terminal 37 that is coupled to the junction of the cathodes of the diodes 32 and 33. Accordingly, at time $t_1$ the control potential from unit 43 is effective to render each of the diodes of the switching system nonconductive, thereby effectively opening the signal-translating channel and interrupting the translation of the video-frequency signal to the input circuit of the image-reproducing device 18. At time $t_2$ the value of this control potential falls below the threshold level, as represented in curve C, and the potential of the battery 35 is again effective to render the diode-switching system conductive, thereby completing the circuit of the signal-translating channel to the image-reproducing device 18. The opening and closing operation of the switching system in the signal-translating channel is represented by curve D of Fig. 2 of the drawings. At time $t_5$ the control signal developed by the units 41—43, inclusive, exceeds the threshold level of the switching system and the diodes are again rendered nonconductive and remain thereat until time $t_6$ when the control potential drops below the threshold level, thus causing the switching system to be open during the interval $t_5$—$t_6$ as represented by curve D. During the succeeding intervals $t_6$—$t_8$, $t_8$—$t_9$, $t_9$—$t_{11}$, and $t_{11}$—$t_{12}$, the switching conditions of the diodes appear as shown by curve D for reasons which are clear in view of the previous explanations given in connection with the control intervals $t_1$—$t_2$, $t_2$—$t_5$, and $t_5$—$t_6$.

Referring now to curve E of Fig. 2, there is represented the waveform of the output potential of the transient-modifying electrical signal-translating system as applied to the input terminals 31, 31 of the image-reproducing device 18. It will be seen that at time $t_0$ the output potential of the system is zero, corresponding to the zero value of the signal, represented by curve A at the time $t_0$, as it appears across the output terminals 30, 30 of the video-frequency amplifier 16. At time $t_1$ the diode-switching system is open or nonconductive, as shown by curve D, so that no signal then appears at the terminals 31, 31 and this condition continues until time $t_2$ whereupon the switching system closes. It will be noted from curve E that the potential applied to the terminals 31, 31 at time $t_2$ rises very suddenly to a positive value due to the abrupt closing of the electronic switches and also due to the low impedance of the output circuit of the amplifier 16, this low impedance enabling the condenser 34 to be charged very rapidly. Thus the signal translated shortly after time $t_2$ to the image-reproducing device corresponds in magnitude with the signal, represented by curve A shortly after time $t_2$, which is applied to the output terminals 30, 30 of the video-frequency amplifier 16. Referring again to curve E, it will be seen that the video-frequency signal remains at this level until the time $t_6$. Although the switching system opens at time $t_5$, as represented in curve D, the condenser 34 is charged just prior to that time to a potential level represented by curve E and remains at that value since the charge cannot leak off instantaneously because the discharge path for the condenser through the input circuit of the image-reproducing device 18 has a high impedance when the switching system is open. At time $t_6$ the switching system closes and, as will be noted from curve A, the potential applied to the terminals 30, 30 becomes substantially zero. Accordingly, the potential developed across the condenser 34 at time $t_6$ decreases suddenly to substantially the zero value, as represented by curve E, because of the low impedance of the discharge path for the condenser comprising the cathode resistor of the cathode-follower amplifier of the video-frequency amplifier 16. The switching system remains closed until time $t_8$ whereupon it is suddenly opened and, since the potential at the terminals 30, 30 was substantially zero during the interval $t_6$—$t_8$, no change in potential occurs at the terminals 31, 31. At time $t_9$ the switching system closes whereupon the potential developed across the condenser 34 corresponds to that represented by curve A at the time $t_9$. At time $t_{11}$ when the switching system again opens, the charge on the condenser again is a relatively large positive value as represented by curve A so that the potential across the condenser 34 is maintained at the positive value for the interval $t_9$—$t_{12}$. However, at time $t_{12}$ the electronic switch suddenly closes and the potential appearing across the condenser 34 drops to substantially zero, as represented in curve E, thereby corresponding in magnitude at that time with the potential developed across the terminals 30, 30, as may be seen from curve A of Fig. 2.

Thus it will be seen from the foregoing explanation that the signal-translating channel of the system 17 normally has a substantially linear signal-translating characteristic except for substantially the entire portion of each of the described transients. The translating system is therefore able faithfully to translate video-frequency signals except for substantially the entire interval of each of the transients, during which intervals the signal-translating channel is disconnected from the image-reproducing device 18 and hence the channel is effectively unresponsive to the transients. The operation of the switching system in the channel is such that the relatively steep unidirectional transients of the type represented by curve A of Fig. 2 are so modified as effectively to form new or more desirable transients of the sort shown by curve E and having slopes which are much steeper than those of the original transient. These modified transients in turn so control or modify the intensity of the electron beam of the image-reproducing device 18 that the image reproduced on the fluorescent screen thereof has exceptional sharpness.

The balanced arrangement of the bridge-type switching system including the diodes 27, 28, 32 and 33 is effective to prevent control potentials supplied thereto from the amplifier 43 from appearing in the output signal delivered by the signal-translating channel to the input circuit of the image-reproducing device 18.

Although the operation of the transient-modifying system has been explained in connection with the application thereto of a television signal having transients with only relatively steep slopes or generally rounded edges as represented by curve A of Fig. 2, it may be undesirable to transform all rounded edges of the television signal to steep transients of the type represented by curve E since gradual variations in the shading of the television picture may be wanted in order that the reproduction be accurate. Accordingly, the parameters of the signal-translating system are proportioned so that the rounded edges of a television signal transient having a duration much greater than a selected transient duration are translated by the channel without distortion. It will also be clear that the threshold bias potential established by the battery 35 in the switching system may be so selected that only those transients which have a derivative exceeding a predetermined amplitude level are effective to overcome that bias and thereby improve the sharpness of the reproduction afforded by the image-reproducing device 18.

While the transient-modifying signal-translating system has been described with relation to a signal-translating channel having a bandwidth corresponding to that present in the picture-signal translating channel of a conventional television receiver, it will be manifest that a channel having a bandwidth substantially less than that of a conventional receiver may be employed with a transient-modifying signal-translating system in accordance with the present invention without impairing the sharpness of reproduction of the television picture. In the absence of the described units which produce a nonlinear action in the signal-translating channel during the interval of a transient, the channel just mentioned is unable to translate the very high-frequency components of the transient due to its narrow pass-band characteristic, and therefore the translation by the channel is impaired. However, the sharpness improvement circuits of the present invention associated with the signal-translating channel enable the latter to translate to the image-reproducing device 18 a useful video-frequency signal including steep transients so that the reproduced picture has a sharpness comparable to that provided by a conventional television receiver although somewhat limited in detail. However, this loss in detail is much less annoying to the observer than the loss of sharpness which results with a conventional receiver including a picture-signal translating channel having restricted bandwidth.

*Description of modified system of Fig. 3*

Referring now to Fig. 3 of the drawings, there is represented schematically another embodiment of the invention which is adapted to be connected to the terminals 30, 30 and 31, 31 of the receiver represented in Fig. 1. The transient-modifying signal-translating system represented in Fig. 3 comprises a pair of similar series-connected units 45 and 46 which form a signal-translating channel normally having a substantially linear signal-translating characteristic for an applied television signal except for at least a portion of a transient. These units include a pair of cascaded-coupled oppositely poled rectifier devices 47 and 48 in the signal-translating channel. These rectifier devices may be of the contact, crystal or the thermionic type. One electrode of the rectifier device 47 is coupled to a terminal 30 through a coupling condenser 49 and the other electrode thereof is coupled to a similar electrode of the device 48 through a coupling condenser 50. The remaining electrode of the device 48 is connected to an output terminal 31. A series-connected battery 52 and a resistor 53 are coupled between the junction of the condenser 49 and the rectifier device 47 and the other input terminal 30 of the unit 45. Unit 46 includes similarly arranged elements 54 and 55. The circuit of unit 45 includes a parallel-connected condenser 57 and a resistor 58 while unit 46 includes similarly connected components 59 and 60. A series-connected coupling condenser 62 and an inductor 63 are coupled in parallel with the rectifier device 47 while corresponding elements of the unit 46 include a condenser 64 and an inductor 65. The batteries 52 and 54 are so poled with relation to their corresponding rectifier devices 47 and 48 as to maintain them in a normally conductive condition.

*Operation of Fig. 3 system*

Considering now the operation of the transient-modifying signal-translating system of Fig. 3, the units 45 and 46 during the conductive intervals of the rectifier devices 47 and 48 have a linear signal-translating characteristic and, in the absence of a transient in the video-frequency signal, faithfully translate the video-frequency signal between the terminals 30, 30 and 31, 31. When the rectifier devices 47 and 48 are conductive, they present a very low impedance to a signal translated thereby. Thus a substantially linear signal-translating path between the terminals just mentioned comprises the condenser 49, the rectifier device 47, the condenser 50, the rectifier device 48 and the conductive connection between the two lower terminals 30 and 31. When a negative-going transient is applied to the terminals 30, 30 and the change in the amplitude thereof between its first level and its second level occurs at a rapid rate, the potential appearing across the condenser 57 cannot follow the rapid change of potential of the applied signal. Thus a potential related to a derivative of the transient or a time-difference signal is developed across the two terminals of the rectifier device 47 of such polarity as to render that device nonconductive, thereby interrupting the signal translated to the terminals 31, 31. Thus the condenser 57 constitutes a control-circuit means in the signal-translating channel of the transient-modifying system for developing a control effect related to a derivative of the transient and in the form of a bias potential for application to the rectifier device 47. The biasing of the rectifier device 47 to a nonconductive condition establishes an oscillatory condition in the circuit comprising the inductor 63, the condenser 62, the condenser 57, the resistor 58, the condenser 49 and the low-impedance source coupled to the terminals 30, 30. The parameters of the circuit just described are so proportioned that after a short interval of the order of a half cycle of the resonant frequency a potential difference is established across the rectifier device 47 which is effective to permit the rectifier device again to become conductive, thus reclosing that circuit in the signal-translating channel. Since the rectifier device 47 is normally conductive, positive-going transients do not cause it to become nonconductive and are thus translated in a substantially linear manner. The unit 46 responds in an inverse manner to unit 45, that is, unit 46 responds to positive-going transients in a manner similar to that explained in connection with the application of negative-going transients to the unit 45, so that further explanation of its operation is deemed unnecessary. Hence, during the interval in which the rectifier devices are conductive, the system has a linear signal-translating channel except for a short interval after the initiation of the transient when the signal translated by the channel is interrupted. Thus the operation of the Fig. 3 system corersponds essentially to that explained in connection with the graphs of Fig. 2 for the Fig. 1 system.

*Description of Figs. 4 and 5 embodiments*

Referring now to Fig. 4 of the drawings, there is represented diagrammatically a further embodiment of the invention which is suitable for connection between the output terminals 40, 40 of the detector and A. G. C. supply 15 and the input terminals 31, 31 of the image-reproducing device 18. A video-frequency amplifier 71 and a variable delay network 76 are coupled in cascade between the pairs of terminals just mentioned. Coupled between the terminals 40, 40 and an input circuit of the variable delay network 76 is a control circuit responsive to a derivative of a transient applied to the terminals just mentioned. This control circuit comprises a conventional differentiating circuit 73 and a delay-control system 74 for controlling the time delay provided by the network to a signal applied thereto from the unit 71, thereby modifying the transient produced by the described system. The operation of this type of a transient-modifying system will be apparent after a consideration of the embodiment of the invention represented in Fig. 5.

The schematic circuit diagram of Fig. 5 represents a specific form of the system appearing in Fig. 4 of the drawings. The video-frequency amplifier 71 is coupled between the terminals 40, 40 and a time-delay network 76, the latter comprising serially connected inductors 72, 72 and shunt-connected condensers 70, 70. The remote end of the network 76 is provided with an M-derived termination 104 which is connected to ground through a battery 75. An intermediate point of the network is connected to the control electrode of a pentode-type electron tube 77 while the two end points of the network are connected to the control electrodes of similar tubes 78 and 79, respectively. The cathodes of these tubes are grounded, the screen electrodes are connected in a conventional manner to a source of potential indicated as +Sc, and the anodes are connected together and to one of the output terminals 31 and to a source of potential +B through a series-connected resistor 80 and a peaking coil 81. Thus the tubes 77, 78, and 79 have parallel-connected space-current paths and comprise electron-tube means coupled to the signal-translating channel and to predetermined portions of the time-delay network 76. The battery 75 is effective to provide a predetermined bias potential to the input circuits of the tubes 77–79, inclusive.

The differentiating circuit 73′ coupled to an output circuit of the video-frequency amplifier 71 comprises a transformer 83 having a primary winding 84 and a center-tapped secondary winding 85, the mid-point of the latter being grounded. Individual windings of the transformer are connected in parallel with individual ones of condensers 86, 87 and 88 which are shown in broken-line construction since they may be comprised in whole or in part of the distributed capacitance of the windings associated therewith. Damping resistors 90, 91 and 92 are connected across the individual sections of the transformer to broaden the frequency-response characteristic thereof. The differentiating circuit 73′ has its constants so proportioned that the circuit includes an inherent time delay substantially equal to that of the first section of the delay network 76 which is connected to the control electrode of the tube 77. If necessary, the differentiating circuit may include a conventional time-delay network (not shown) capable of affording to a signal translated thereby the time delay just mentioned. A pair of rectifier devices 93 and 94, which may be of the contact, crystal or thermionic type, are serially connected but with opposite polarity across the secondary winding 85 of the transformer 83. The junction of the devices is connected to ground through a resistor 95 and also is directly connected to the suppressor electrode of the tube 77. The other electrode of the rectifier device 93 is connected through a coupling condenser 96 to the suppressor electrode of the tube 78 while the corresponding electrode of the device 94 is connected to the corresponding electrode of the tube 79 through a coupling condenser 97. The suppressor electrodes of the tubes 78 and 79 are connected to ground through respective resistors 99 and 101, each of which is arranged in series relation with a battery 100 which is effective normally to maintain those tubes in a condition of anode-current cutoff. The potentials supplied to the tube 77 are such that it is normally conducting.

*Operation of the Fig. 5 system*

The operation of the Fig. 5 transient-modifying signal-translating system may be best understood by reference to the curves of Fig. 6. Each of the curves presently to be described is exaggerated somewhat for the purpose of clarity. Curve A of Fig. 6 represents a fragmentary portion of the television signal applied to the control electrode of tube 77, which signal includes transients occurring in the intervals $t_0$—$t_2$ and $t_3$—$t_5$, this signal having substantially the same waveform as the signal applied to the video-frequency amplifier 71 but being delayed in time with reference thereto. Curve B of Fig. 6 represents the output signal appearing at terminals 31, 31. As previously mentioned, the tubes 78 and 79 are normally biased to anode-current cutoff so that a television signal not including the transients would normally be translated through the video-frequency amplifier and the first section of the delay network 76 to the input circuit of the tube 77. Since the tube 77 is normally conductive, the output signal is supplied from the anode-cathode circuit thereof to the terminals 31, 31.

During the interval $t_0$—$t_2$ of the positive-going transient of curve A, however, the differentiating circuit 73' develops a control potential of positive polarity for application through the condenser 97 to the suppressor electrode of the tube 79. Since the center tap of the secondary winding 85 is grounded, a signal of negative polarity is applied between the electrode of the rectifier device 93 connected to the condenser 96 and ground. This control potential renders the device 93 conductive and develops a negative potential at the ungrounded terminal of the resistor 95 for application to the suppressor electrode of the tube 77. This in turn drives the tube 77 toward cutoff. The control potentials applied to the tubes 77 and 79 have a duration approximately corresponding to that of the duration $t_0$—$t_2$ of the positive-going transient. Accordingly, only the tube 79 is in such a condition as to translate to the terminals 31, 31 a signal applied to the input circuit of the tube from the terminated portion of the delay network 76. The over-all delay afforded by the network 76 may be such that it corresponds substantially to one or two times the interval $t_0$—$t_2$. Accordingly, at time $t_2$ the signal translated by the network 76, and particularly the positive-going transient thereof, has not reached the input circuit of the conducting tube 79 so that the transient does not appear in the output circuit of that tube. At approximately time $t_2$ the positive control effect on the suppressor electrode of the tube 79 terminates as does also the control effect of negative polarity on the corresponding electrode of the tube 77. Thus the positive-going transient, as it appears at the output terminals 31, 31 has a steep slope of the type represented during the interval $t_1$—$t_2$ of curve B. The tube 77 thereupon returns to its initial condition while the tube 79 again is biased to anode-current cutoff by the potential of the battery 100 thus marking the end of the positive-going transient.

During the interval $t_2$—$t_3$ when the television signal does not include a transient, the signal is again translated from the intermediate point of the delay network 76 through the space-current path of the tube 77 to the input terminals 31, 31. Accordingly, the waveform of the output signal appears during this interval as represented by curve B of Fig. 6 and thus corresponds substantially with that of the signal represented by curve A during the same interval.

During the interval $t_3$—$t_5$ a negative-going transient occurs, as represented by curve A, and a positive control potential is applied through the condenser 96 to the suppressor electrode of the tube 78. This potential is effective to overcome the bias afforded by the battery 100, thus rendering the tube conductive during the interval just mentioned. Simultaneously, a negative potential is applied across the series combination of the device 94 and the resistor 95, thereby rendering the former conductive and developing a negative control potential for application to the suppressor electrode of the tube 77. Since a negative control potential is then being applied by the transformer winding 84 to the suppressor electrode of the tube 79, both of the tubes 77 and 79 are driven substantially to anode-current cutoff during the interval $t_3$—$t_5$ of the negative-going transient. Since the input electrode of the tube 78 is connected to the input terminals of the delay network 76, the negative-going transient represented by curve A effectively has already passed the input terminals of the network. Thus, in so far as it affects tube 78, the positive amplitude portion of the television signal effectively has terminated at approximately time $t_3$ so that the negative-going transient of the signal applied to the video-frequency amplifier has the steep slope represented by curve B during the interval $t_3$—$t_4$. It will be clear that the output signal of curve B appearing at the terminals 31, 31 is of somewhat shorter duration than the signal represented by curve A which is applied to the input terminals 40, 40 of the system but has much sharper transients. In the manner previously mentioned, these transients are effective to improve the sharpness of the picture reproduced by the image-reproducing device 18. The fact that curve B has a shorter duration than curve A indicates that a small geometric distortion is present in the reproduced picture. This small distortion, which is effective to reduce somewhat the width of the white areas and widen the black areas of the reproduced picture, may be desirable to enhance the apparent contrast of the picture and to compensate for the finite size of the scanning spot produced by the image-reproducing device. If desired, this small geometric distortion may be reduced by using more complex derivative signals for application to the suppressor electrodes of the tubes 77, 78 and 79.

It will be clear from the foregoing description and explanation that the rectifier devices 93 and 94 and the input circuits of the tubes 77, 78 and 79 comprise means responsive to the control potential developed by the unit 73' for varying the transconductance of the tubes just mentioned thereby to modify the time delay afforded by the time-delay network 76 and the signal-translating characteristic of the signal-translating channel between the pairs of terminals 40, 40 and 31, 31 within a short interval after the initiation of a transient applied to the terminals 40, 40.

From the foregoing descriptions of the various embodiments of the invention, it will be apparent that the signal-translating systems in accordance with the present invention represent simple and inexpensive systems for modifying or reconstructing relatively sharp transients to produce therefrom much steeper transients. It will also be manifest that a transient-modifying signal-translating system embodying the present invention may be utilized in a television receiver to enable it to produce a very sharp picture. A television receiver employing a transient-modifying signal-translating system in accordance with the invention is effective to reduce eye fatigue and displeasure ordinarily experienced by some observers of television pictures. It will also be clear that a transient-modifying signal-translating system embodying the present invention is particularly suited for use in a television receiver having a cathode-ray tube with a relatively large display area since the system is effective to improve the sharpness of reproduction of the picture produced by the receiver.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A transient-modifying electrical signal-translating system for a television receiver for translating a television picture signal which may include unidirectional transients comprising: a television signal-translating channel normally having a substantially linear signal-translating characteristic for an applied television picture signal; control-circuit means coupled in circuit with said channel for developing a control effect related to a derivative of said transient; and means responsive to said control effect for modifying the signal-translating characteristic of said channel within a short interval after the initiation of said transient, whereby the output signal of said channel approximately corresponds to said applied signal with modified transients.

2. A transient-modifying electrical signal-translating system for a television receiver for translating a television picture signal which may include unidirectional transients comprising: a television signal-translating channel normally having a substantially linear signal-translating characteristic for an applied television picture signal; control-circuit means coupled in circuit with said channel for developing a control effect related to a derivative of said transient; and means effectively in said channel responsive to said control effect for modifying the signal-translating characteristic of said channel within a short interval after the initiation of said transient, whereby the output signal of said channel approximately corresponds to said applied signal with modified transients.

3. A transient-modifying electrical signal-translating system for a television receiver for translating a television picture signal which may include unidirectional transients comprising: a television signal-translating channel normally having a substantially linear signal-translating characteristic for an applied television picture signal; differentiating means coupled to said channel for developing a derivative of said applied signal; control-circuit means coupled to said differentiating means and effectively responsive to said derivative of said transient for developing therefrom a control effect; and means responsive to said control effect for modifying the signal-translating characteristic of said channel within a short interval after the initiation of said transient, whereby the output signal of said channel approximately corresponds to said applied signal with modified transients.

4. A transient-modifying electrical signal-translating system for a television receiver for translating a television picture signal which may include unidirectional transients comprising: a television signal-translating channel normally having a substantially linear signal-translating characteristic for an applied television picture signal; differentiating means coupled to said channel for developing a derivative of said applied signal; control-circuit means coupled to said differentiating means for developing from said derivative a control effect related to the absolute magnitude of said derivative of said applied signal; and means responsive to said control effect for modifying the signal-translating characteristic of said channel within a short interval after the initiation of said transient, whereby the output signal of said channel approximately corresponds to said applied signal with modified transients.

5. A transient-modifying electrical signal-translating system for a television receiver for translating a television picture signal which may include unidirectional transients comprising: a television signal-translating channel normally having a substantially linear signal-translating characteristic for an applied television picture signal; differentiating means coupled to said channel for developing a derivative of said applied signal; control-circuit means including a full-wave rectifier coupled to said differentiating means for developing from said derivative a control effect corresponding to the absolute magnitude of said derivative of said applied signal; and means responsive to said control effect for modifying the signal-translating characteristic of said channel within a short interval after the initiation of said transient, whereby the output signal of said channel approximately corresponds to said applied signal with modified transients.

6. A transient-modifying electrical signal-translating system for a television receiver for translating a television picture signal which may include unidirectional transients comprising: a television signal-translating channel normally having a substantially linear signal-translating characteristic for an applied television picture signal; control-circuit means coupled in circuit with said channel for developing a control effect related to a derivative of said transient; and switching means in said channel and responsive to said control effect for modifying the signal-translating characteristic thereof within a short interval after the initiation of said transient, whereby the output signal of said channel approximately corresponds to said applied signal with modified transients.

7. A transient-modifying electrical signal-translating system for a television receiver for translating a television picture signal which may include unidirectional transients comprising: a television signal-translating channel, including a pair of output terminals and an energy-storage device coupled thereacross, normally having a substantially linear signal-translating characteristic for an applied television picture signal; control-circuit means coupled in circuit with said channel for developing a control effect related to a derivative of said transient; and switching means in said channel and responsive to said control effect for modifying the signal-translating characteristic thereof within a short interval after the initiation of said transient, whereby the output signal of said channel approximately corresponds to said applied signal with modified transients.

8. A transient-modifying electrical signal-translating system for a television receiver for translating a television picture signal which may include unidirectional transients comprising: a television signal-translating channel normally having a substantially linear signal-translating characteristic for an applied television picture signal; control-circuit means coupled in circuit with said channel for developing a control effect related to a derivative of said transient; and electron-tube means effectively in said channel and responsive to said control effect for modifying the signal-translating characteristic thereof within a short interval after the initiation of said transient, whereby the output signal of said channel approximately corresponds to said applied signal with modified transients.

9. A transient-modifying electrical signal-translating system for a television receiver for translating a television picture signal which may include unidirectional transients comprising: a television signal-translating channel, including output terminals and an energy-storage device coupled thereacross, normally having a substantially linear signal-translating characteristic for an applied television picture signal; control-circuit means coupled in circuit with said channel for developing a control effect related to a derivative of said transient; and normally closed switching means in said channel and responsive to said control effect for interrupting the signal translated by said channel thereby modifying the signal-translating characteristic thereof within a short interval after the initiation of said transient, whereby the output signal of said channel approximately corresponds to said applied signal with modified transients.

10. A transient-modifying electrical signal-translating system for a television receiver for translating a television picture signal which may include unidirectional transients comprising: a television signal-translating channel normally having a substantially linear signal-translating characteriestic for an applied television picture signal; control-circuit means coupled in circuit with said channel for developing a control effect related to a derivative of said transient exceeding a predetermined amplitude value; and means responsive to said control effect for modifying the signal-translating characteristic of said channel within a short interval after the initiation of said transient, whereby the output signal of said channel approximately corresponds to said applied signal with modified transients.

11. A transient-modifying electrical signal-translating system for a television receiver for translating a television picture signal which may include unidirectional transients comprising: a television signal-translating channel normally having a substantially linear signal-translating characteristic for an applied television picture signal; control-circuit means coupled in circuit with said channel for developing a control effect related to the first derivative of said transient; and means responsive to said control effect for modifying the signal-translating characteristic of said channel within a short interval after the initiation of said transient, whereby the output signal of said channel approximately corresponds to said applied signal with modified transients.

12. A transient-modifying electrical signal-translating system for a television receiver for translating a television picture signal which may include unidirectional transients comprising: a television signal-translating channel normally having a substantially linear signal-translating characteristic for an applied television picture signal; control-circuit means coupled in circuit with said channel for developing a control effect related to a derivative of said transient; and a bridge-rectifier circuit, including a first pair of diagonally disposed terminals coupled in series relation with said channel and a second pair of diagonally disposed terminals coupled across said control-circuit means, responsive to said control effect for modifying the signal-translating characteristic of said channel within a short interval after the initiation of said transient, whereby the output signal of said channel approximately corresponds to said applied signal with modified transients.

13. A transient-modifying electrical signal-translating system for a television receiver for translating a television picture signal which may include unidirectional transients comprising: a television signal-translating channel normally having a substantially linear signal-translating characteristic for an applied television picture signal, said channel having a frequency bandwidth substantially less than that of a conventional television receiver signal-translating channel so that translation of said transients thereby tends to be impaired; control-circuit means coupled in circuit with said channel for developing a control effect related to a derivative of said transient; and means responsive to said control effect for modifying the signal-translating characteristic of said channel within a short interval after the initiation of said transient, whereby the output signal of said channel approximately corresponds to said applied signal with modified transients which are much steeper than said impaired transients.

14. A transient-modifying electrical signal-translating system for a television receiver for translating a television picture signal which may include unidirectional transients comprising: a television signal-translating channel normally having a substantially linear signal-translating characteristic for an applied television picture signal; control-circuit means in said channel for developing a control effect related to a derivative of said transient; and means in said channel responsive to said control effect for modifying the signal-translating characteristic of said channel within a short interval after the initiation of said transient, whereby the output signal of said channel approximately corresponds to said applied signal with modified transients.

15. A transient-modifying electrical signal-translating system for a television receiver for translating a television picture signal which may include unidirectional transients comprising: a television signal-translating channel normally having a substantially linear signal-translating characteristic for an applied television picture signal; control-circuit means in said channel for developing a control effect related to a derivative of said transient; and a pair of cascade-coupled oppositely poled normally closed means in said channel responsive to said control effect for modifying the signal-translating characteristic of said channel within a short interval after the initiation of said transient, whereby the output signal of said channel approximately corresponds to said applied signal with modified transients.

16. A transient-modifying electrical signal-translating system for a television receiver for translating a television picture signal which may include unidirectional transients comprising: a television signal-translating channel, including output terminals and an energy-storage device coupled thereacross, normally having a substantially linear signal-translating characteristic for an applied television picture signal; control-circuit means in said channel for developing a control effect related to a derivative of said transient; normally closed means responsive to said control effect for interrupting the signal translated by said channel thereby modifying the signal-translating characteristic of said channel within a short interval after the initiation of said transient; and means for reclosing said interrupting means after said short interval, whereby the output signal of said channel corresponds to said applied signal with modified transients.

17. A transient-modifying electrical signal-translating system for a television receiver for translating a television picture signal which may include unidirectional transients comprising: a television signal-translating channel normally having a substantially linear signal-translating characteristic for an applied television picture signal; control-circuit means coupled in circuit with said channel for developing at least one control effect related to a derivative of said transient; and a time-delay control means coupled to said channel and responsive to said control effect for modifying the signal-translating characteristic thereof within a short interval after the initiation of said transient, whereby the output signal of said channel approximately corresponds to said applied signal with modified transients.

18. A transient-modifying electrical signal-translating system for a television receiver for translating a television picture signal which may include unidirectional transients comprising: a television signal-translating channel normally having a substantially linear signal-translating characteristic for an applied television picture signal; control-circuit means coupled in circuit with said channel for developing a control effect related to a derivative of said transient; a time-delay network coupled to said channel; and means responsive to said control effect for controlling the time delay provided by said network thereby modifying the signal-translating charcteristic of said channel within a short interval after the initiation of said transient, whereby the output signal of said channel approximately corresponds to said applied signal with modified transients.

19. A transient-modifying electrical signal-translating system for a television receiver for translating a television picture signal which may include unidirectional transients comprising: a television signal-translating channel normally having a substantially linear signal-translating characteristic for an applied television picture signal; control-circuit means coupled in circuit with said channel for developing a control effect related to a derivative of said transient; time-delay means coupled to said channel; electron-tube means coupled to said channel and to predetermined portions of said time-delay means; and means responsive to said control effect for varying the transconductance of said electron-tube means thereby modifying the time delay afforded by said time-delay means and the signal-translating characteristic of said channel within a short interval after the initiation of said transient, whereby the output signal of said channel approximately corresponds to said applied signal with modified transients.

20. A transient-modifying electrical signal-translating system for a television receiver for translating a television picture signal which may include unidirectional transients comprising: a television signal-translating channel normally having a substantially linear signal-translating characteristic for an applied television picture signal; control-circuit means coupled in circuit with said channel for developing a control effect related to a derivative of said transient; time-delay means coupled to said channel; electron-tube means, having parallel-connected space-current paths, coupled to said channel and to predetermined portions of said time-delay means; and means responsive to said control effect for varying the transconductance of said electron-tube means thereby modifying the time delay afforded by said time-delay means and the signal-translating characteristic of said channel within a short interval after the initiation of said transient, whereby the output signal of said channel approximately corresponds to said applied signal with modified transients.

References Cited in the file of this patent

UNITED STATES PATENTS

| Number | Name | Date |
|---|---|---|
| 1,315,539 | Carson | Sept. 9, 1919 |
| 2,271,876 | Seeley | Feb. 3, 1942 |
| 2,363,813 | Somers | Nov. 28, 1944 |
| 2,421,138 | Wheeler | May 27, 1947 |